Sept. 3, 1935.    G. B. BRITTON    2,013,550
CUTTING MACHINE BLOCK
Filed April 20, 1934    2 Sheets-Sheet 1

INVENTOR
GLENN B. BRITTON
BY
Ely & Barrow
ATTORNEYS

Sept. 3, 1935.	G. B. BRITTON	2,013,550
CUTTING MACHINE BLOCK
Filed April 20, 1934	2 Sheets-Sheet 2

INVENTOR
GLENN B. BRITTON
BY
ATTORNEYS

Patented Sept. 3, 1935

2,013,550

UNITED STATES PATENT OFFICE 2,013,550

CUTTING MACHINE BLOCK

Glenn B. Britton, Hannibal, Mo., assignor to International Shoe Company, St. Louis, Mo., a corporation of Delaware Application April 20, 1934, Serial No. 721,535

7 Claims. (Cl. 164—58)

The present invention relates to improvements in machines for cutting, stamping or embossing sheet material and particularly to improvements in the organization and construction of the platen or block upon which the material, usually in sheet form, is supported. The purposes of the invention are, among others, to obviate certain serious defects which are present in the usual or ordinary platen constructions, to increase the life and effectiveness of the platen, to insure better and more efficient results, and to increase the life of both the platen and the dies or knives.

The invention has been perfected in connection with clicking machines for cutting blanks from sheet rubber such as employed in the manufacture of shoe soles from rubber stocks, heels or the like, but it is not necessarily limited to such use and may be extended to other and analogous fields and for cutting and embossing all sorts of materials.

The usual form of platen or cutting block consists of a resistant plate or surface, usually of metal which is backed up with a padding of some sort. For this purpose layers of solid rubber pulp and paper layers have been employed, but these have not proven satisfactory as the material does not yield uniformly over the entire area or becomes permanently deformed resulting in uneven wear, uneven cutting results and excessive deterioration of the cutting surface and cutters. By the improved platen construction these objections are overcome, and more even and uniform cutting is secured, the knives or dies and platens have longer life, the speed of the machine is increased and other desirable results are secured.

In the drawings and in this specification the best known and preferred form of the invention is shown, but it will be specifically understood that the form and proportions illustrated are non-essential and may be varied within the range contemplated and secured in the appended claims.

Figure 1:
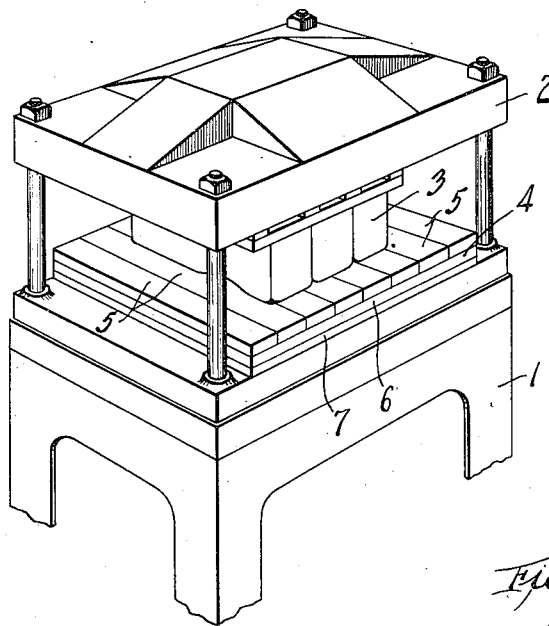
Figure 1 is a general perspective view of a cutting or clicking machine such as is used in the preferred embodiment of the invention.

In Figure 1 of the drawings a clicking machine of any usual or preferred form is shown comprising a base 1 and a head 2 to which a gang cutting die 3 is attached; the platen is indicated at 4. These elements are such as are usually found in a machine of this type and detailed description is unnecessary as any standard or preferred form of machine may be employed.

Figure 2:
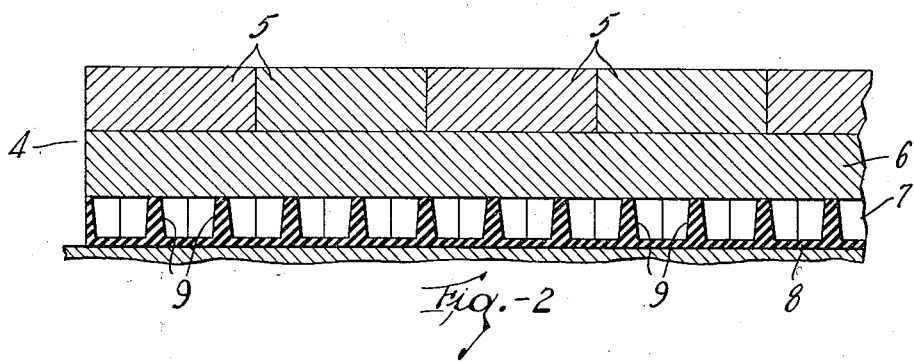
Figure 2 is an enlarged cross-section through a platen such as is employed in connection with the invention.

In the particular form illustrated in Figure 2 the platen is composed of an upper or cutting surface consisting of a series of tempered steel plates 5, 5 which are supported upon an intermediate steel plate 6 and which is in turn supported upon the yielding pad or cushion 7. This assembly is mounted upon the platen member of the press as will be understood.

The superior results obtained by my cutting block are due to the conception of a yielding cellular pad, made of rubber as the material best adapted for the purpose. The requirements for this type of pad or backing are such as have called for extensive experimentation and trial in arriving at a pad suitable for the purpose, but it will be understood and appreciated that, having explained the best form of pad known to me, those skilled in the art may be able to develop substitute pads within the purview of my invention. The details as to the size and location of the cells or voids in the pad affect the results secured. The pad should have the property of yielding uniformly over the whole cutting area and should on the other hand be sufficiently stable to maintain its form and effectiveness under rapidly repeated blows delivered in the operation of the machine. The use of these machines is usually very severe and the characteristics of the pad must be made to respond to these rigid requirements.

One form of pad illustrated is of appreciable thickness (one form of pad which has been employed by me being approximately $\frac{3}{8}$ of an inch) and is made of a tough high grade rubber stock such, for example, as might be employed in tire treads. The under surface 8 of the pad is continuous, and the body of the pad is formed with many cells or voids which allow for the flow of the rubber when impact is applied thereon. The yielding of the pad is secured by the flow of rubber into these voids rather than by deformation of the pad. In the form shown in the drawings, these cells or voids are substantially hexagonal and arranged in honeycomb form, being separated by continuous and unbroken ribs 9 of appreciable thickness. These ribs taper upwardly so that their enlarged bases rest upon and are united integrally with the base 8. The purpose of tapering the ribs is to give increasing stability to them as they approach the base by which they are prevented from spreading. The pad thus has sufficient stability to resist the constant and repeated blows and to enable the pad to recover instantly therefrom for the next impact. This uniform distribution of the cells or voids gives a uniform yielding quality to the entire surface of the platen. It will have the same yield at all points and will not become deformed, lumpy or irregular, as has been the case with all previous types of padding with which I am familiar. As the pad is integral throughout and every rib or projection tied to and supported by the adjacent ribs and connected integrally with a continuous base, the pad performs the work required of it without any of the objections inherent in other pads, and lasts practically indefinitely.

Figure 3:
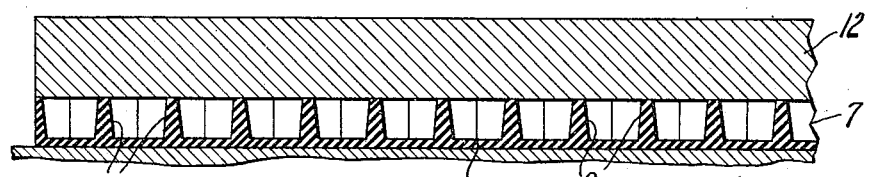
Figure 3 is a similar view of another form of platen.
Figure 4:
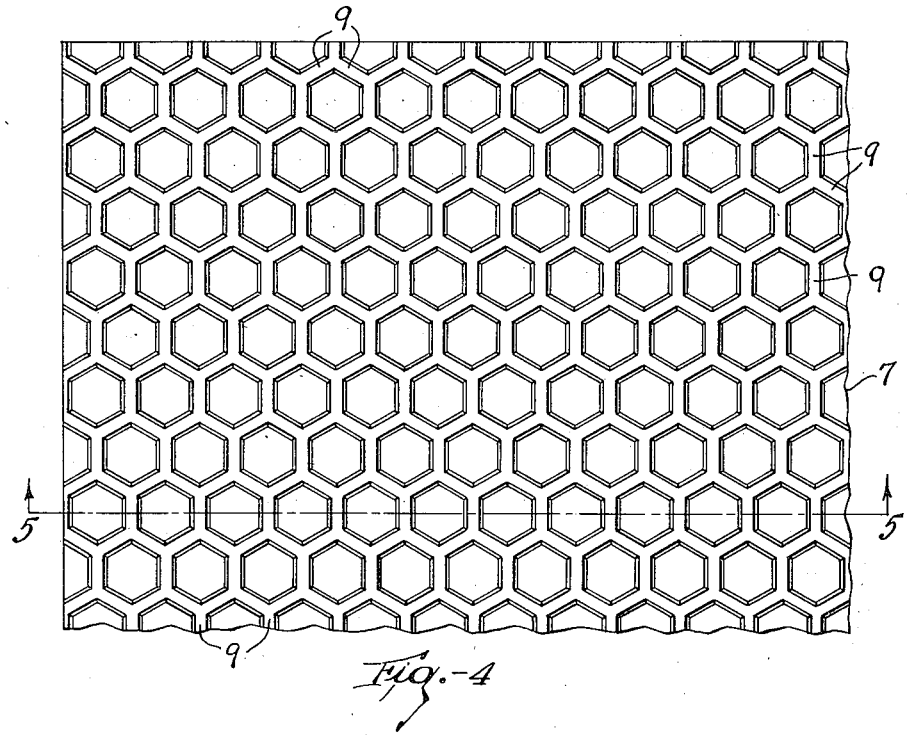
Figure 4 is a face view of the preferred form of yielding block used in connection with the platen by which the best and most accurate results are secured.
Figure 5:
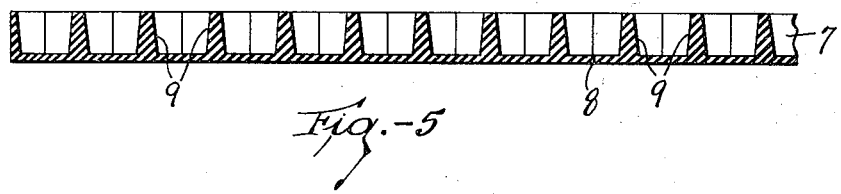
Figure 5 is a section on the line 5—5 of Figure 4.

In the form of cutting block shown in Figure 3 a single tempered steel plate 12 is employed in place of the composite plate shown in Figure 2.

Figure 6:
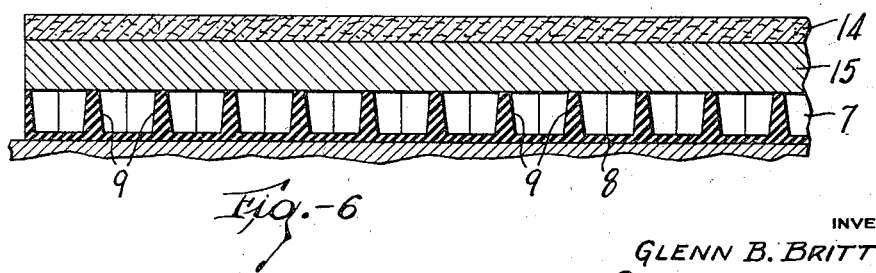
Figure 6 is a sectional view through a platen such as used in embossing or stamping as distinguished from cutting.

In Figure 6, in which the invention is shown as employed in an embossing press, the upper surface of the platen is composed of a softer yielding matrix plate 14 supported upon a spring steel intermediate plate 15 which is in turn supported upon the pad 7.

The above description and drawings are to be taken as explanatory of the invention merely for the reasons given above. It will be understood that where a "cutting" platen is referred to in the several claims, the intention is to cover the similar or analogous use in the embossing field in which the requirements are substantially the same.

Although the pad has been illustrated and described with the base portion 8 underlying the ribs 9, it is not limited to this particular manner of use and conveniently may be reversed so that continuous portion 8 overlies the ribs 9, in which position said continuous portion 8 assists in distributing locally applied loads. The thickness of continuous portion 8 and ribs 9 may be altered to conform to various conditions of use to which the pad may be put, and other modification may be resorted to without departing from the spirit of the invention or the scope of the appended claims.

What is claimed is:

1. A cutting block comprising an upper platen member providing a cutting surface resting upon a backing member of rubber, said backing member being resilient throughout its entire body and having a plurality of voids into which the surrounding rubber will flow to permit yielding of the body of the pad throughout the cutting area thereof.

2. A cutting block comprising an upper platen member providing a cutting surface supported upon a backing member of rubber, said backing member being homogeneous throughout and having a plurality of voids distributed uniformly to permit yielding of the body of the pad uniformly throughout the cutting area thereof by flow of the rubber into the voids, and a base on the pad integral therewith.

3. A cutting block comprising an upper platen member providing a cutting surface resting upon a backing member of rubber, said backing member being homogeneous throughout having a plurality of voids distributed to permit yielding of the body of the pad throughout the cutting area by flow of the rubber into the voids, the body comprising a plurality of upstanding tapered elements.

4. A cutting block comprising an upper platen member providing a cutting surface resting upon a backing member of rubber of a uniform character throughout, said backing member comprising an integral base and a web of ribs extending therefrom, forming a plurality of uniform voids over the cutting area.

5. A cutting block comprising an upper platen member providing a cutting surface supported upon but unattached to a backing member of rubber of a uniform character throughout, said backing member comprising an integral base and a web of ribs extending therefrom, forming a plurality of uniform voids over the cutting area, said ribs tapering away from said base.

6. A cutting block comprising an upper platen member providing a cutting surface supported upon a backing member of rubber, said backing member comprising an integral base and a web of ribs extending therefrom and forming a plurality of hexagonal voids of uniform size uniformly distributed throughout the cutting area.

7. A cutting block comprising an upper platen member providing a cutting surface supported upon a backing member of rubber, said backing member comprising an integral base and a web of ribs projecting therefrom and forming a plurality of hexagonal voids of uniform size uniformly distributed throughout the cutting area, the ribs tapering toward their free margins.

GLENN B. BRITTON.